United States Patent [19]

Marini et al.

[11] Patent Number: 4,554,213

[45] Date of Patent: Nov. 19, 1985

[54] HIGH PUNCHABILITY HEAT RESISTANT COATING FOR SHEET METAL

[75] Inventors: Paolo Marini, Rome; Marcello Candiotti, Terni, both of Italy

[73] Assignees: Centro Sperimentale Metallurgico SpA; Terni - Societa per l'Industria e l'Elettricita SpA, both of Rome, Italy

[21] Appl. No.: 676,300

[22] Filed: Nov. 29, 1984

[30] Foreign Application Priority Data

Jan. 4, 1984 [IT] Italy .............................. 47511 A/84

[51] Int. Cl.$^4$ ...................... B32B 15/08; B32B 27/42; C08K 5/05; C08L 63/00
[52] U.S. Cl. .................................. 428/418; 428/461; 428/463; 428/469; 523/402; 523/426; 523/451; 524/127; 524/417; 528/101
[58] Field of Search .................. 523/451, 402, 426; 524/127, 417; 528/101; 428/418, 461, 463, 469

[56] References Cited

U.S. PATENT DOCUMENTS

| | | | |
|---|---|---|---|
| 2,060,572 | 11/1936 | Heck | 524/417 |
| 2,541,027 | 2/1951 | Bradley | 528/108 |
| 2,732,367 | 1/1956 | Shokal | 528/108 |
| 3,890,265 | 6/1975 | Corrigan | 524/417 |
| 4,160,756 | 7/1979 | Nishida et al. | 524/417 |
| 4,195,003 | 3/1980 | Hurlock et al. | 524/417 |
| 4,219,607 | 8/1980 | Cammack et al. | 524/127 |
| 4,397,970 | 8/1983 | Campbell et al. | 528/108 |
| 4,427,745 | 1/1984 | Pearson | 524/417 |
| 4,430,367 | 2/1984 | Lat | 524/417 |

FOREIGN PATENT DOCUMENTS

| | | | |
|---|---|---|---|
| 47-43201 | 11/1972 | Japan | 524/417 |
| 52-50343 | 4/1977 | Japan | 528/108 |
| 53-2893 | 2/1978 | Japan | 524/417 |
| 53-46336 | 4/1978 | Japan | 524/417 |
| 53-80430 | 7/1978 | Japan | 524/417 |
| 53-125936 | 11/1978 | Japan | 524/417 |

Primary Examiner—Ronald W. Griffin
Attorney, Agent, or Firm—Young & Thompson

[57] ABSTRACT

Sheet steel used for making the cores of electrical machines is improved as to its punchability by coating it with a heat resistant coating of a complex mixture of phosphates and resins compatible with acid phosphate ions. The coating contains between 60 and 95% by weight of the phosphates and between 5 and 40% by weight of the resins. The resins can be acrylic base resins, ethylene-vinyl acetate copolymer resins, or thermosetting epoxy resins.

4 Claims, No Drawings

HIGH PUNCHABILITY HEAT RESISTANT COATING FOR SHEET METAL

The present invention concerns a new type of high punchability coating for sheet metal in general and especially for sheet steel used to make cores for electrical machines.

For the preparation of these cores, the thin sheet steel with a suitable coating is punched according to the drawing or the shape required and and the punchings are stacked to form the laminated core.

For a number of reasons well known to the experts, the edge of the punching must have a very clean profile; however, as the number of punching operations (or blows) made by the punch increases, it is practically impossible to avoid the formation of burrs on the punched edges and a gradual increase in their size.

The maximum tolerated size of these burrs is variable, depending on the quality standards laid down for the final product, but a limit of about 50 microns can be taken as a good compromise between the quality of the cores produced and the economics of the punching operations.

To increase the number of blows a punch can make before it has to be stripped and sharpened, the hardness of the punch can be increased by using hard alloys containing tungsten carbide or cobalt for the dies, instead of the normal steel, or action can be taken on the sheet metal by making this somehow easier to punch and, in short, by improving the lubricating properties of the insulating coating on the punching.

This latter approach led to the inorganic phosphate-based coatings, which ensured a life of 50–70,000 blows for steel dies, being replaced by completely organic coatings that permitted as many as 300,000 blows to be attained with a steel punch. However, these had their drawbacks, such as their instability at temperatures higher than 350°–400° C., which prevented stress relieving of the punching or the welding of the outer edges of cores for rotating electrical machinery stators.

Next followed inorganic or mixed inorganic-organic coatings based on chromic acid or its derivatives. These ensured decided advantages as regards punchability but some serious problems still remained. In fact, because of the amount of pollution chromium causes, it is indispensible to provide costly equipment for the treatment of coating bath residues and to protect the working environment. Then, too, the high oxidizing power of chromic acid and its derivatives jeopardizes the stability of coating baths containing organic resins and, in the long run, can also jeopardize that of the coatings produced.

However, the good punchability of the coatings containing chromates which, in the case of the new monolayer types in particular, permit a punch life of over one million blows—a figure not so far attained by other types of coating—induces manufacturers to tolerate the higher costs and the greater difficulties involved in using such coatings.

The purpose of this invention is to improve this situation, by proposing a new type of coating for sheet steel for electrical uses, endowed with very good electrical insulation and punchability; it is relatively cheap, heat-resistant and easy to apply to the sheet, while also being stable over the long term, weldable, non-polluting and non-toxic.

These objectives are attained by this new type of inorganic-organic coating, wherein the inorganic part of the bath consists of at least one compound selected from phosphoric acid and its water-soluble derivatives, while the organic part consists of a synthetic resin compatible with the phosphoric acid ions. The resin is of the type which forms stable suspensions or aqueous emulsions and can be advantageously chosen from the group including acrylic resins and their polymers, copolymers and monomers, the ethylenevinyl acetate copolymers, and the thermosetting epoxy resins of the type used as the base for painting car bodies.

The composition of the coating bath, on a dry basis, as per this invention is preferably within the following range: inorganic part 60–95% by weight, organic part 5–40% by weight. These compositional limits provide a good compromise between punchability and weldability; in fact, an increase in the organic part increases the former and decreases the latter. However, the compositional range just indicated cannot be considered as the only one possible. Indeed, it is reasonable to think, for instance, that special fields of use of resins and/or new formulations of resins and/or particular component cost conditions and/or interest restricted to only a few characteristics of the coating, etc., may make possible or even advisable modifications to the compositional range indicated above in a preferential manner.

The bath for application of the coating is of the water-based type, whose active components content preferably ranges between 5 and 30% by weight. These limits, too, can be modified, however, depending on the type of coating plant adopted, for instance. In a plant wherein strip passes between squeezer rollers, the greater the pressure exerted by these, the higher can be the concentration of the active components in the bath.

It should be borne in mind, however, that the thickness of the final coating must be less than 2 microns, and preferably between 0.5 and 1 micron, since in this range a good stacking factor in cores can be attained while ensuring that the coating has very good surface appearance, adhesion, punchability, electrical insulation and weldability.

As already mentioned, the resin chosen must be compatible with a solution of phosphoric acid or its water-soluble derivatives. This means that when the aqueous suspension or emulsion of resin is mixed with the inorganic part of the coating bath there must be no significant changes in its physical characteristics either immediately or in the long term. This is not an easy objective to attain, since many resins separate out or cause the whole bath to gel when the coating bath is being made up.

By way of further characterization of the resins indicated above as usable in the present invention, it can be said that the acrylic-base resin emulsions must be of the type stabilized with non-ionic surfactants, while in the case of the ethylene-vinyl acetate copolymers, the emulsion must not be stabilized with polyvinyl alcohol or else it must have no reaction with borax. Thermosetting epoxy resins, for their part, must be of the type neutralized with phosphoric acid.

The above resins have been tried successfully. However, other types, too, such as polyvinylchloride-base resins, for instance, could be employed, the only requirement being that they must be stable to phosphoric acid and its water-soluble derivatives.

In fact, the resin plays a twofold role in the coating: it acts as a lubricant owing to its organic constitution, and as a binder for the inorganic part, to prevent the breakaway of inorganic particles in the punched zone which would exert an abrasive action on the blanking die.

It ensues that the type or class of resins that can be employed has no significant influence on the final characteristics of the coating.

Coating tests run on a pilot scale have given the results schematized in the following table:

| Coating bath | Coating thickness μm | No of blows | Weld-ability | Insulation Ω × cm |
|---|---|---|---|---|
| $H_3PO_4$ 10% Kg 211<br>Resin A Kg 8 | 0.9 | $1.3\ 10^6$ | 1 | 10–20 |
| $H_3PO_4$ 10% Kg 211<br>Resin A Kg 16 | 1 | $1.8\ 10^6$ | 0.76 | 30–50 |
| $H_3PO_4$ 10% Kg 211<br>Resin B Kg 8 | 0.6 | $1.1\ 10^6$ | 1 | 10–20 |
| $Al(H_2PO_4)_3$ 10% Kg 203<br>Resin B Kg 6 | 0.8 | $8\ 10^5$ | 1 | 10–15 |
| $H_3PO_4$ 10% Kg 211<br>Resin C Kg 11 | 0.6 | $1.3\ 10^6$ | 0.9 | 15–30 |
| $Al(H_2PO_4)_3$ 10% Kg 203<br>Resin C Kg 6 | 0.8 | $9\ 10^5$ | 1 | 10–15 |

Key to Table:
$H_3PO_4$ 10% is an aqueous solution containing 10% by weight $H_3PO_4$
$Al(H_2PO_4)_3$ 10% is an aqueous solution containing 10% by weight $Al(H_2PO_4)_3$
Resin A is a polyacrylic resin of the methyl-methacrylate type in aqueous emulsion containing 50% by weight (Trade name: Crilat 2454, Montedison)
Resin B is an ethylene vinyl acetate resin in aqueous emulsion containing 55% by weight (Trade name: Airflex 410, Air Products and Chemical Inc.)
Resin C is a thermosetting, non-pigmented epoxy resin for cataphoresis, neutralized with $H_3PO_4$, in aqueous emulsion containing 50% by weight (Trade name: Type 779205, IVI)
No of blows is that number possible with a 2 × 1 cm rectangular profile steel punch before a burr more than 50 μm high forms on the punched sheet.
Weldability is the ratio of the welding speed on a stack of punchings coated as per the present invention and an identical stack of punchings that have simply been phosphated; the welding is done at the maximum speed that provides a bead free of blow-holes.
Insulation is the insulation value measured as per the ASTM Franklin Test.

The coatings described above were obtained by dipping the sheet (non-orientated Si steel containing 0.5–3.1% Si by weight) in the coating bath at room temperature, then by baking in air at 260° C. for 15 s. They also withstand stress relieving of the punchings at 830° C. in a neutral atmosphere.

The coating as per the invention can be applied to any steel, preferably of the punching variety. It consists of a complex mixture, not yet determined, of phosphates (of iron and other elements such as Al, Ca, Mg, etc., coming from water-soluble salts of phosphoric acid) and of resins compatible with phosphoric acid ions.

I claim:

1. High punchability sheet steel, coated with a complex mixture consisting essentially of phosphates and resins compatible with acid phosphate ions, containing between 60 and 95% by weight of the phosphates and between 5 and 40% by weight of the resins.

2. High punchability sheet steel as claimed in claim 1, in which said resins are acrylic base resins.

3. High punchability sheet steel as claimed in claim 1, in which said resins are ethylene-vinyl acetate copolymer resins.

4. High punchability sheet steel as claimed in claim 1, in which said resins are thermosetting epoxy resins.

* * * * *